March 12, 1946.　　　C. E. DRAKE　　　2,396,495
INDEXING APPARATUS
Filed June 28, 1943　　　2 Sheets-Sheet 1
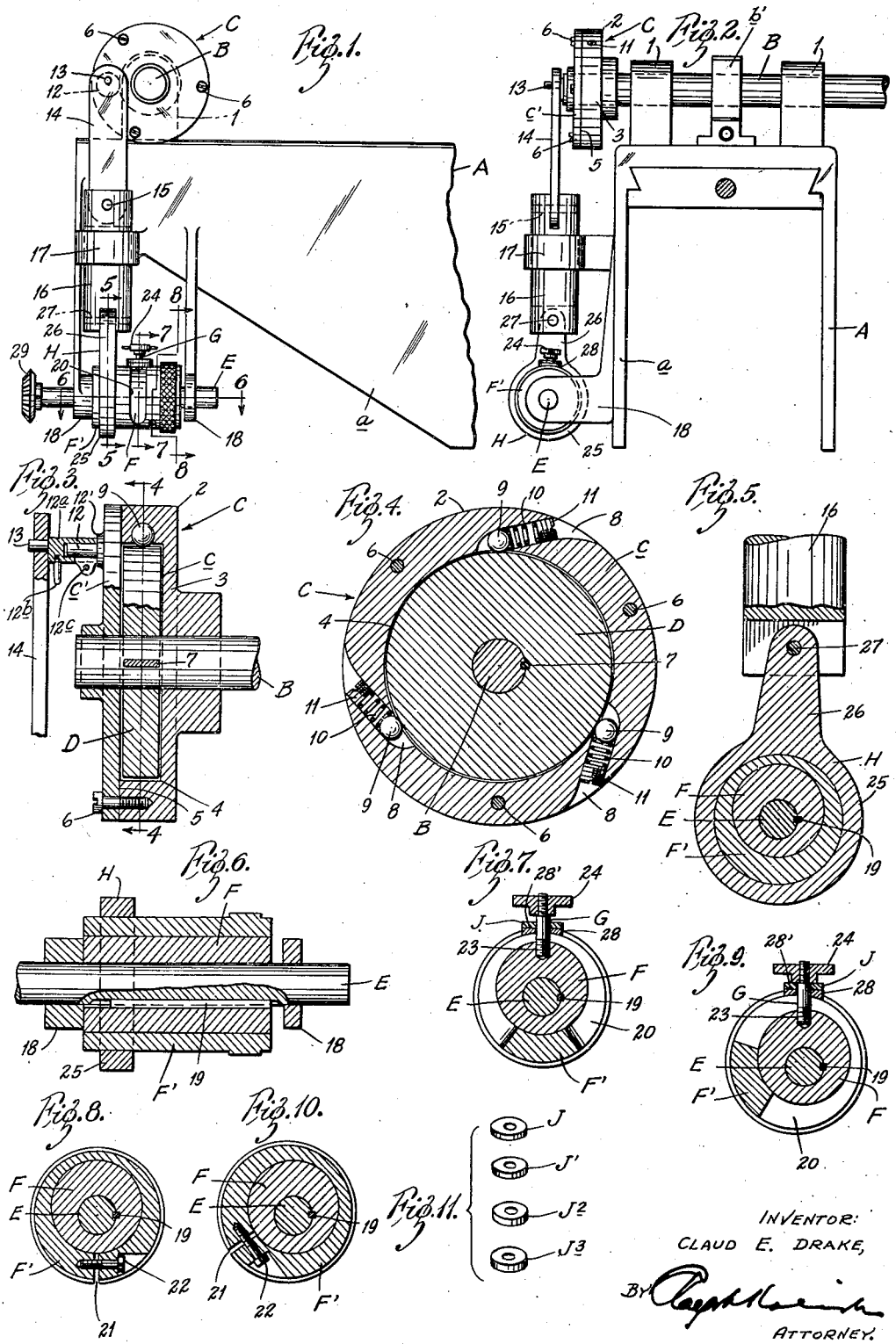
INVENTOR:
CLAUD E. DRAKE,
BY
ATTORNEY.

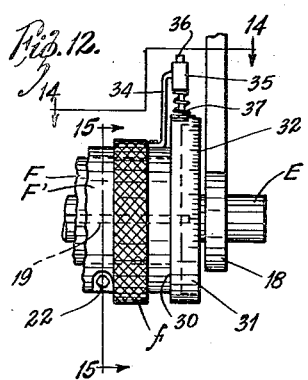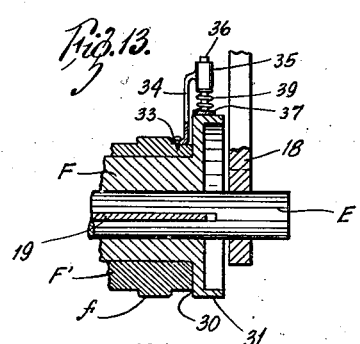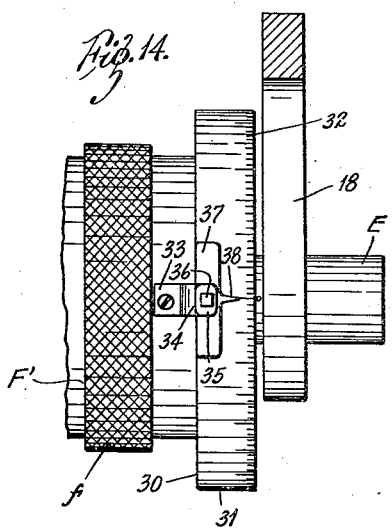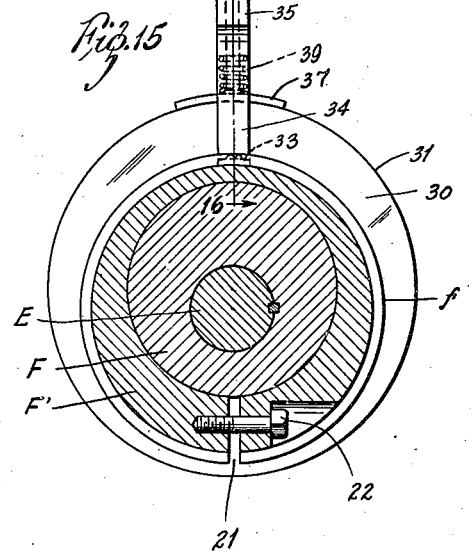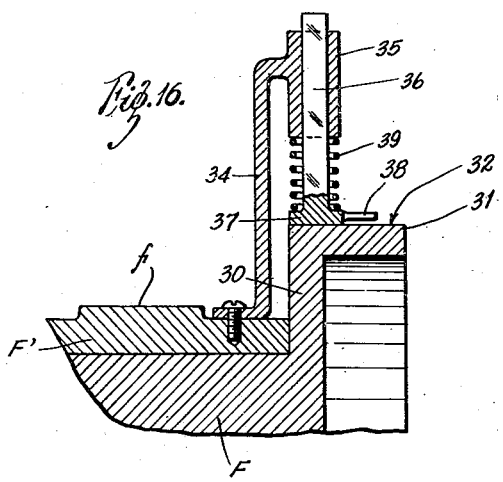

Patented Mar. 12, 1946

2,396,495

UNITED STATES PATENT OFFICE 2,396,495

INDEXING APPARATUS

Claud E. Drake, Brentwood, Mo.

Application June 28, 1943, Serial No. 492,558

12 Claims. (Cl. 51—216)

This invention relates generally to indexing apparatus and, more particularly, to a certain new and useful improvement in indexing apparatus particularly, though not exclusively, adapted for use in the sharpening of the peripheral teeth of rotary or disk-cutters and the like.

My invention has for its chief object the provision of an apparatus uniquely constructed for accurately and precisely indexing the rotary movement of a disk-cutter in precise relation to the pitch of its peripheral teeth for sharpening co-operation with a rotary grinder or other such structure.

My invention has for a further object the provision of an indexing apparatus of the type and for the purpose which is simple in structure, which may be economically constructed, which is readily adjustable to meet the requirements of cutters of different tooth-pitch, and which is efficient in the performance of its intended functions.

And with the above and other objects in view, my invention resides in the novel features of form, construction, arrangement, and combination of parts presently described and pointed out in the claims.

In the accompanying drawings (two sheets),

Figure 1 is an end elevational view of a peripherally toothed rotary-cutter indexing apparatus constructed in accordance with and embodying my invention;

Figure 2 is a side elevational view of the apparatus;

Figure 3 is an enlarged fragmental view, partly in section, of the head of the apparatus;

Figure 4 is a transverse sectional view through the head of the apparatus taken approximately on the line 4—4, Figure 3;

Figure 5 is an enlarged vertical sectional view of the apparatus taken approximately on the line 5—5, Figure 1;

Figure 6 is an enlarged transverse sectional view of the apparatus, partly broken away, taken approximately on the line 6—6, Figure 1;

Figures 7 and 8 are transverse vertical sectional views of the machine taken approximately on the respective lines 6—6 and 8—8, Figure 1;

Figures 9 and 10 are views similar to Figures 7 and 8, but with the companion tubular eccentric members or barrels of the machine relatively adjusted for varying the rotary movement of the center supporting shaft in accordance with the pitch of the teeth of the particular cutter;

Figure 11 illustrates in perspective different spacing members for selected use with the companion eccentric members in obtaining corresponding variations in the indexing actuations of the cutter-supporting shaft;

Figure 12 is an enlarged fragmental view of a slightly modified indexing apparatus embodying my present invention;

Figure 13 is a sectional view of the parts of the modified apparatus shown in Figure 12;

Figure 14 is an enlarged plan view of the parts of the modified apparatus taken approximately on the line 14—14, Figure 12;

Figure 15 is a sectional view taken approximately on the line 15—15, Figure 12; and Figure 16 is a sectional view taken approximately on the line 16—16, Figure 15.

Referring now more in detail and by reference characters to the drawings, which illustrate practical embodiments of my invention, the apparatus or machine includes a table, bracket, or other suitable support A, upon the top of which are suitably fixed bearings 1, 1, for a cutter-supporting shaft B, and it will be understood that, while not here shown, the peripherally toothed cutters to be sharpened are selectively suitably mounted detachably on shaft B for tooth engagement by the grinding or sharpening mechanism of the apparatus, also not here shown.

Journaled for rotation on an end-portion of the shaft B, is an annular housing or shell C, which preferably includes a member $c$ of disk formation having a rim or peripheral portion 2 and a body-portion 3 centrally recessed, as at 4, and a complementary or companion member $c'$ in the form of a disk or plate fitting over the recess 4 and at its one marginal side face, as at 5, flatwise upon the adjacent side face of the peripheral portion 2 of housing member $c$ and being marginally fixed, as by stud-bolts or the like 6, to the peripheral portion 2 of the member $c$, all as best seen in Figure 3. Housed within the shell C and keyed or otherwise fixed, as at 7, to and upon the shaft B, is a clutch-disk D.

As best seen in Figure 4, the housing or shell-member $c$ is provided in its peripheral portion 2 with a series of circumferentially spaced angular slots 8, disposed in which for engaging the peripheral face of the housed clutch-disk D for intermittently driving the disk D and its attached shaft B in one direction only, are respective spheres 9 each yieldingly retained in its seat and for clutch-engagement by means of a coil-spring 10 adjustably secured in its slot 8 as by means of a retaining nut or plug 11. While not here shown in detail, it will be understood that the apparatus includes a suitable clutching mechanism $b'$ mounted on the table A for engaging the shaft B for retaining the shaft B against rotation in a reverse direction.

Mounted on the outer face of the housing plate c', is a suitable boss 12', and projecting outwardly from the boss 12', is a stud or the like 12 upon which, in turn, is mounted for rotatory adjustment a split barrel 12ª equipped with a manipulating handle 12ᵇ and with suitable bolt-equipped ears 12ᶜ for securing the barrel 12ª in rotarily adjusted position upon the stud 12. Provided eccentrically on the outer end of the barrel 12ª, is a longitudinally disposed pin or stud 13 for pivoted connection with a link 14 having, in turn, pivoted connection at its lower end, as at 15, with a bar 16 arranged for lengthwise reciprocation in a bearing 17 projecting from the outer face of a wall a of the table or support A. It may be observed here that the adjustable barrel 12ª provides for accurate or micrometric adjustment of the pin 13 with respect to the diametrical dimension of the clutch-member D, so that the pin or stud 13 may be precisely disposed at a radial distance from the projected axis of the cutter shaft B equal to the radius of the clutch-disk D.

Projecting from the support-wall a in spaced relation downwardly from the bearing 17, is a pair of suitably spaced brackets 18, 18, providing a bearing for a drive-shaft E disposed in right angular relation to the cutter shaft B, as best seen in Figures 1 and 2.

Keyed or otherwise fixed, as at 19, on the shaft E intermediate the brackets 18, is an inner eccentric barrel or member F, and surrounding and rotatable about the inner eccentric member F, is an outer companion eccentric barrel or collar F' provided transversely through a portion of its circumference with a circumferential slot, as at 20. In its one or right-hand end-portion, the outer eccentric collar or member F' is split, as at 21, and equipped with a fastening-bolt 22 having its head disposed in a peripheral recess in the member F' and its shank spanning the split 21 for releasably securing the outer eccentric member F' in rotarily adjusted position upon the inner eccentric member F, for purposes presently appearing.

Having one end seated, as at 23, in the inner eccentric F and projecting or upstanding in and through the slot 20, is a short rod or staff G threaded at its outer end-portion to detachably receive a nut or other spacer retaining member 24.

Journaled upon, and adjacent an end-portion of, the outer eccentric member F', is the head 25 of a pitman H having a laterally extending arm or strap portion 26 pivotally, as at 27, engaged with the lower end of the shiftable member or bar 16.

Loosely engaging the staff G and spanning the slot 20 in the outer eccentric member F', is a saddle 28 having a flat upper face, as at 28', and an arcuate under face, the latter conforming to, and the saddle 28 at its arcuate under face resting upon, the outer arcuate face of the outer eccentric member F.

Respectively co-operable with the eccentric members F and F' and the staff or rod G and its nut 24 and saddle 28, are spacing members or disks, which vary in thickness in precise accordance with the pitch of the teeth of the respective cutters to be sharpened or ground. For instance, the spacing member J may have a width of .2618", spacing member J¹ may have a width of .3142", spacing member J² may have a width of .3927", and spacing member J³ may have a width of .4960" for indexing the rotary actuations of the cutter shaft B in the sharpening of supported cutters equipped with peripheral teeth of respectively corresponding pitch.

Now, in use and operation, let it be assumed that a disk-cutter having a tooth-pitch of, say, .3927" is to be ground or sharpened. Such cutter, while not here shown, is fixed upon the shaft B, and shaft B is hence to be intermittently rotarily driven in one direction through arcs of .3927" circumferential length. Accordingly, a spacing member J³ is first loosely disposed on the staff G and seated on saddle 28. Nut 24 is then threaded to its normal position upon the staff G with the spacer J³ thus loosely disposed intermediate the saddle 28 and nut 24. Bolt 22 is loosened, and the outer eccentric member F', facilitated by means of the knurled ring f, is rotarily shifted upon the inner eccentric F until the particular spacing member J³ is impinged between the inner face of the nut 24 and the outer flat face 28' of the eccentric member F', when the bolt 22 is threaded inwardly to again releasably lock the outer eccentric member F' in such eccentrically shifted position, as shown, upon the inner eccentric member F.

The drive shaft E may, by any suitable means, as, for instance, gearing, as at 29, suitably connected with a prime mover (not shown), be rotarily actuated, whereupon the member H, through and by its engagement with the companion eccentric members F, F', will be correspondingly oscillated. In turn, through and by the bar 16 and connecting link 14, the housing C will be rotarily driven first in one direction and then in the opposite direction through an arc corresponding in length to the thickness of the spacing member J³. In such rotary oscillations of the shell C, the several spheres 9 will alternately frictionally or clutchwise drivingly engage, and freely roll upon, the housed disk D, and the cutter-shaft B accordingly rotarily shifted through increments of a circle correspondingly to such imparted driven actuations of the clutch-disk D. Thus the particular cutter being sharpened or worked is intermittently rotarily shifted in one direction through arcs corresponding precisely to and indexed by the thickness of the particular spacer that may be selected and mounted on the staff G.

Having reference now more particularly to Figures 12 to 16, both inclusive, the inner eccentric member F is formed at an end with an annular enlargement 30 having a flanged peripheral portion 31 annularly equipped with an index or graduations, as at 32. Fixed at its flanged lower end, as at 33, upon the adjacent end portion of the outer eccentric member F', is a strip 34 supporting a sleeve 35, in which is loosely mounted a relatively short shaft 36 provided at its lower end with an arcuate saddle 37 for seating upon the peripheral flange 31, as best seen in Figure 16.

Projecting laterally from the saddle 37, is a pointer 38 for co-operation with the graduations 32, and coiled on the shaft 36 intermediate the sleeve 35 and saddle 37, is a spring 39 for yieldingly retaining the saddle 37 and its supported pointer 38 in co-operative relation with the graduations 32.

Normally, as when the eccentric member F and F' are in the relative positions illustrated in Figure 15, the pointer 38 is in zero position. Nut 22 being loosened, the outer eccentric member F' may be rotarily shifted, as I have described, upon the inner eccentric member F, in which movement the graduations 32 are shifted with respect to the pointer 38 to correspond to the pitch of the teeth of the particular cutter being sharpened and the eccentric members F and F' again locked in such selected or adjusted position, the indexing graduations 32 and their cooperative pointer 38 thus performing the function of the several spacing members J, J¹, J², J³, and so on in indexing the rotary actuations of the cutter shaft B and the particular supported cutter.

The structure is exceedingly efficient in the performance of its intended functions, and it is to be understood that changes and modifications in the form, construction, arrangement, and combination of the several parts of the apparatus may be made and substituted for those herein shown and described without departing from the nature and principle of my invention.

Having thus described my invention, what I claim and desire to secure by Letters Patent is:

1. Indexing apparatus including, in combination, a rotary cutter-shaft, and means for intermittently rotarily shifting the cutter shaft through selected equal arcuate distances, said means comprising a second shaft having an eccentric barrel fixed thereon, an eccentric collar mounted rotatably on the barrel and having means for locking the collar on the barrel at any selected position of adjustment, a clutch disk having connection with the cutter shaft, and means connecting the eccentric members and the disk for rotarily oscillating the disk on rotary actuation of the eccentric members.

2. Indexing apparatus including, in combination, a rotary cutter-shaft, and means for intermittently rotarily shifting the cutter shaft through selected equal arcuate distances, said means comprising a second shaft having an eccentric barrel fixed thereon, an eccentric collar mounted rotatably on the barrel and having means for locking the collar on the barrel at any selected position of adjustment, a clutch disk having connection with the cutter shaft, a rotary shell housing the clutch disk, members intermediate the eccentric members and the shell for rotarily oscillating the shell on rotary actuations of the eccentric members, and means for drivingly connecting the shell and disk during the rotary actuations of the shell in one direction.

3. Indexing apparatus including, in combination, a rotary cutter-shaft, and means for intermittently rotarily shifting the cutter shaft through selected equal arcuate distances, said means comprising a second shaft having an eccentric barrel fixed thereon, an eccentric collar mounted rotatably on the barrel and having means for locking the collar on the barrel at any selected position of adjustment, a clutch disk having connection with the cutter shaft, a rotary shell housing the clutch disk, members intermediate the eccentric members and the shell for rotarily oscillating the shell on rotary actuations of the eccentric members, and spring-pressed spheres for frictionally engaging the disk for rotarily actuating the disk during the rotary actuations of the shell in one direction.

4. Indexing apparatus including, in combination, a rotary cutter-shaft, and means for intermittently rotarily shifting the cutter shaft through selected equal arcuate distances, said means comprising a second shaft having an eccentric barrel fixed thereon, an eccentric collar mounted rotatably on the barrel and having means for locking the collar on the barrel at any selected position of adjustment, a clutch disk having connection with the cutter shaft, a rotary shell housing the clutch disk, a pitman oscillatory during rotary actuations of the eccentric members, members pivotally connecting the pitman with the shell for rotarily oscillating the shell, and spring-pressed spheres for frictionally engaging the disk for rotarily actuating the disk during the rotary actuations of the shell in one direction.

5. Indexing apparatus including, in combination, a rotary cutter-shaft, and means for intermittently rotarily shifting the shaft through selected equal arcuate distances, said means comprising a second shaft having an eccentric barrel fixed thereon, an eccentric collar mounted rotatably on the barrel and having means for locking the collar on the barrel at any selected position of adjustment, a clutch disk having driving connection with the cutter-shaft, a shell loosely journaled on the cutter-shaft and housing said disk, a pitman oscillatory during rotary actuations of the eccentric members, members pivotally connecting the pitman with the shell for rotarily oscillating the shell, and spring-pressed spheres for frictionally engaging the disk for rotarily actuating the disk during the rotary actuations of the shell in one direction.

6. In an indexing apparatus for a rotary cutter-shaft, a clutch including a driving member and a driven member, said driven member being connected to the cutter-shaft, a pair of companion inner and outer eccentric members disposed in embracing relation one within the other for relative rotation, the outer member having a circumferential slot, a rod fixed at an end in the inner member and projecting radially upwardly through said slot, a head on the rod, means including a spacing-member of selected width disposed on said rod for impingement between the outer eccentric member and said head on relative rotary movement of the eccentric members for gauging the rotated location of the outer eccentric member relatively to the inner eccentric member for indexing the rotary actuations of the shaft, and a pitman operatively mounted at one end upon the outer eccentric member and being at its other end connected to the driving member of the clutch.

7. In an indexing apparatus for a rotary cutter-shaft, a clutch including a driving member and a driven member, said driven member being connected to the cutter-shaft, a pair of companion inner and outer eccentric members disposed in embracing relation one within the other for relative rotation, the outer member having a circumferential slot, a rod fixed at an end in the inner member and projecting radially through said slot, a head on the rod, means including a spacing-member of selected width disposed on said rod for impingement between the outer eccentric member and said head on relative rotary movement of the eccentric members for gauging the rotated location of the outer eccentric member relatively to the inner eccentric member for indexing the rotary actuations of the shaft, means for releasably retaining the eccentric members in relatively rotated relation, and a pitman operatively mounted at one end upon the outer eccentric member and being at its other end connected to the driving member of the clutch.

8. In an indexing apparatus for a rotary cutter-shaft, a clutch including a driving member and a driven member, said driven member being connected to the cutter-shaft, a pair of companion inner and outer eccentric members disposed one upon the other for relative rotation, means comprising a pointer mounted upon one of the eccentric members and co-operable graduations inscribed upon the other of the eccentric members for indexing the rotated location of one member upon the other, and a pitman operatively mounted at one end upon the outer eccentric member and being at its other end connected to the driving member of the clutch.

9. In an indexing apparatus for a rotary cutter-shaft, a clutch including a driving member and a driven member, said driven member being connected to the cutter-shaft, a pair of companion inner and outer eccentric members disposed one upon the other for relative rotation, means comprising an annular series of graduations on the inner eccentric member and a pointer fixed on the outer eccentric member for indexing the rotated location of the outer member upon the inner member, and a pitman operatively mounted at one end upon the outer eccentric member and being at its other end connected to the driving member of the clutch.

10. In an indexing apparatus for a rotary cutter-shaft, a clutch including a driving member and a driven member, said driven member being connected to the cutter-shaft, a pair of companion inner and outer eccentric members disposed one upon the other for relative rotation, means for indexing the rotated location of the outer member upon the inner member, said means including an annular series of graduations on the inner member, and a spring-pressed co-operable pointer on the outer member and a pitman operatively mounted at one end upon the outer eccentric member and being at its other end connected to the driving member of the clutch.

11. Indexing apparatus including, in combination, a rotary cutter-shaft, and means for intermittently rotarily shifting the cutter-shaft through selected equal arcuate distances, said means comprising a second shaft having an eccentric barrel fixed thereon, an eccentric collar mounted rotatably on the barrel and having means for locking the collar on the barrel at any selected position of adjustment, a clutch disk having connection with the cutter-shaft, means for indicating the position of adjustment of the eccentric collar relative to the barrel, and means connecting the eccentric members and the disk for rotarily oscillating the disk on rotary actuation of the eccentric members.

12. Indexing apparatus including, in combination, a rotary cutter-shaft, and means for intermittently rotarily shifting the shaft through selected equal arcuate distances, said means comprising a second shaft having an eccentric barrel fixed thereon, an eccentric collar mounted rotatably on the barrel and having means for locking the collar on the barrel at any selected position of adjustment, means for indicating the position of adjustment of the eccentric collar relative to the barrel, a clutch disk having driving connection with the cutter-shaft, a shell loosely journaled on the cutter-shaft and housing said disk, a pitman oscillatory during rotary actuations of the eccentric members, members pivotally connecting the pitman with the shell for rotarily oscillating the shell, and spring-pressed spheres for frictionally engaging the disk for rotarily actuating the disk during the rotary actuations of the shell in one direction.

CLAUD E. DRAKE.